Patented May 9, 1950

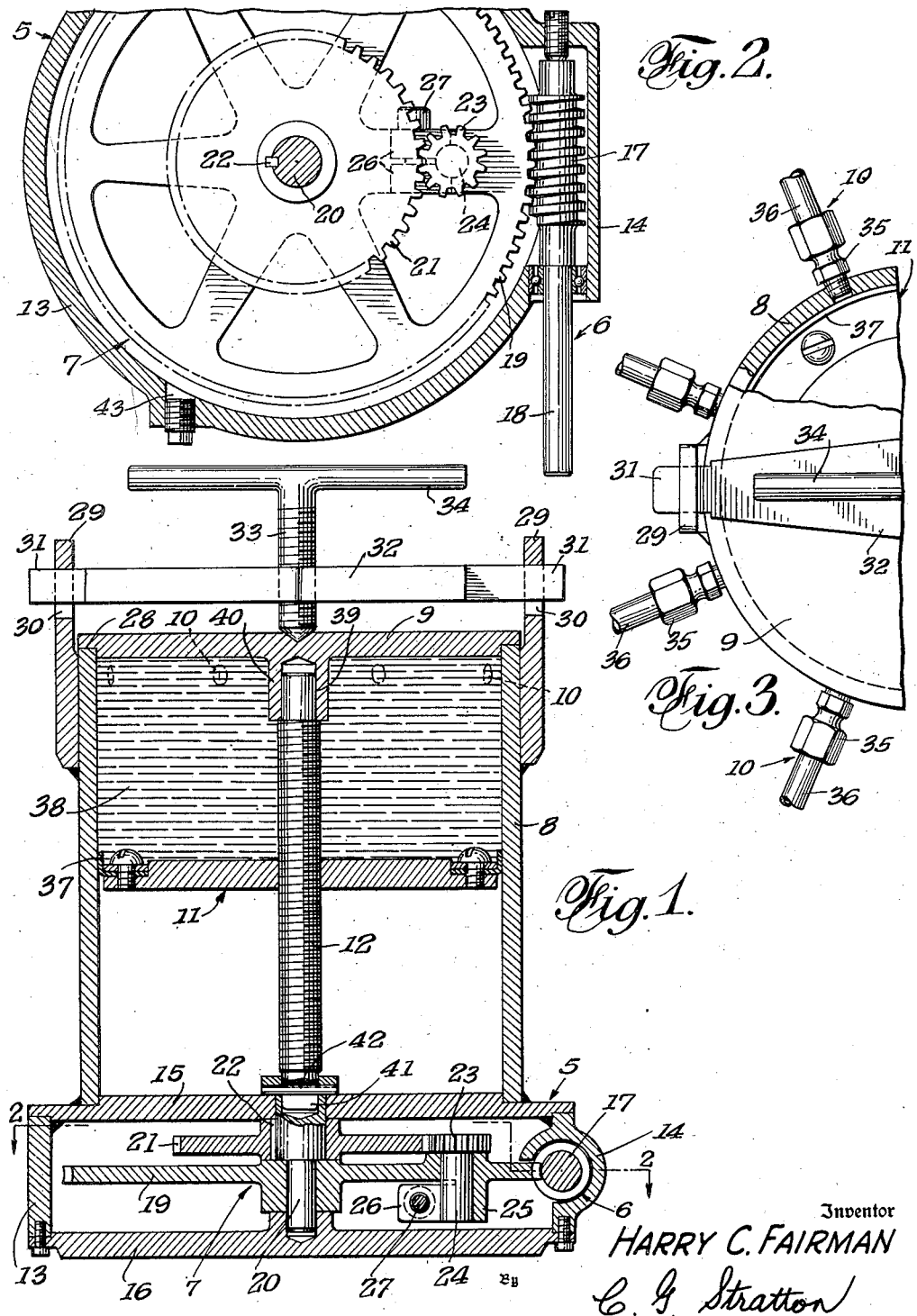

2,506,712

UNITED STATES PATENT OFFICE 2,506,712

PRESSURE LUBRICATOR

Harry C. Fairman, Huntington Park, Calif.

Application July 21, 1947, Serial No. 762,481

7 Claims. (Cl. 184—37)

This invention relates to pressure lubricators and has for an object to provide a unitary device which employs the power of the machine being lubricated to effect feed of lubricant to said machine.

Another object of the present invention is to provide a lubricator, as indicated, which embodies a continuously-driven member for operating the same and wherein lubricant is fed as needed in varying amounts.

Another object of the invention is to provide a lubricator embodying friction brake or slippage means whereby the driving member of the device can move continuously while the lubricant feeding means functions according to the demands of the machine being lubricated.

Another object of the invention is to provide a lubricator of the character described which embodies brake-equipped planetary gearing for effecting intermittent feed of the lubricator by means of a continuously-driven member.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a vertical sectional view of a pressure lubricator constructed according to the present invention.

Fig. 2 is a plan sectional view as taken on line 2—2 of Fig. 1.

Fig. 3 is a broken plan view of the lubricator.

The pressure lubricator which is illustrated in the drawing comprises, generally, a base housing 5 for a driving element 6 and gearing 7 driven thereby, a tubular member 8 extending from said housing, a removable end closure 9 for said tubular member, a series of lubricant outlets 10 in said member adjacent the upper end thereof, a pressure disc 11 within said tubular member, and a stem 12 threadedly engaged with the pressure disc and rotatably connected with gearing 7 for moving said disc in a direction toward the end closure to thereby discharge lubricant through outlets 10.

The base housing 5 comprises an annular wall 13 having a tangential housing part 14 formed therein, a transverse wall 15 defining the top of the housing, and a removable closure plate 16 defining the bottom thereof.

The drive element 6 comprises a worm 17 that resides within the housing part 14 and an outer extension shaft 18 thereof. The latter is adapted to be suitably continuously driven and is particularly adapted to be driven by the machine being served by the lubricator. Accordingly, the shaft 18 may be operatively connected in various ways.

The gearing 7 comprises a worm wheel 19 mounted for free rotation on a stub shaft 20 extending between the walls 15 and 16 and in driving mesh with worm 17, a spur gear 21 secured to said shaft 20, as by a key 22, to drive the same, and a spur pinion 23 carried by the worm wheel and in mesh with gear 21. According to the invention, the axle or shaft 24 of pinion 23 extends through the web part 25 of the worm wheel or through a block carried by the latter and a clamp 26 on part 25, through the medium of a clamp screw 27, serves to frictionally grip said axle 24 to thereby resist rotation of the pinion 23.

The friction brake thus provided functions to effect rotation of gear 21, which is a sun gear, by the pinion 23, which is a planetary gear, upon rotation of the worm wheel 19 by the driving element 6. Thus, when there is no or little resistance to rotation of stub shaft 20 the frictionally-held pinion 23 will interlock gear 21 and worm wheel 19 to move together.

The tubular member 8 is fixed securely to housing 5 and extends upwardly therefrom to terminate at its open end 28. The end closure 9 comprises a plate completely enclosing said open end. Quick-acting means for removably holding plate 9 in place is provided and comprises a pair of diametrically-opposed ears 29 each showing an opening 30 for the ends 31 of a lock bar 32. A pressure screw 33, threadedly engaged through said bar, is provided with a handle 34 and the latter is adapted to be manipulated to press the end of screw 33 against plate 9 and, reactively, to press the ends 31 of bar 32 upwardly against ears 29 to thereby firmly lock plate 9 in place and closing the end of tubular member 8.

The outlets 10 may conventionally comprise fittings 35 radially extending from the tubular member 8 and having flexible tubes 36 that extend to the different points of lubrication of the machine which drives the element 6.

The pressure disc 11 is fitted within the tubular member 8 and is parallel to plate 9. Said disc is provided with an edge seal or gasket 37 to seal against the inner face of said member to define the bottom of a lubricant chamber 38, the top of which comprises plate 9.

The stem 12 is threaded along its length, is threadedly engaged with disc 11, and has bearing, at 39, in a sleeve extension 40 of plate 9. The lower end of said stem is notched or bifurcated at 41 for engagement with a cross pin 42 in stub shaft 20 whereby said stem is removably held in place and is rotated by gearing 7.

In operation, with disc 11 in its lowermost position and cover plate 9 removed, a quantity of lubricant, such as oil or grease is placed in chamber 38. The cover 9 is then replaced. Now, upon rotation of shaft 18, the gearing 7, as above set forth, will rotate stem 12 to feed disc 11 in a direction toward plate 9 and, therefore, discharge lubricant through outlets 10. Said lubricant will fill the bearings or points of lubrication until the same cannot receive more lubricant. This results in a resistance to movement of disc 11 and creates a force of a magnitude to overcome the friction on shaft 24. Consequently, as the drive on shaft 18 continues, pinion 23 will rotate on its shaft 24 and merely track around sun gear 21 until the bearings can receive more lubricant when the friction of brake 26 will again become effective to drive gear 21 and, therefore, feed disc 11.

It will be evident that the lubricant feed is quite flexible in its operation, that slippage of brake 26 will control the feed whether one, or more of the bearings need lubricant; and that a great power advantage has been embodied in the device providing for a relatively-low speed of movement of disc 11 despite a high rate of rotation of shaft 18.

The pressure of brake 26 can be adjusted as desired, and to this end, a plugged opening 43 in housing 5 is provided to give access to brake clamp screw 27. It will also be noted that housing 5 can be packed with lubricant through said opening 43. If desired, a pressure-indicating gage may be provided for chamber 38 to guide the mentioned adjustment of screw 27.

While I have illustrated and described what I now regard as the preferred embodiment of my invention, the construction is, of course, subject to modifications without departing from the spirit and scope of my invention. I therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A lubricator comprising a tubular lubricant containing member having a closed end and having at least one outlet adjacent said end, a threaded stem axially of the tubular member, a pressure disc within the tubular member and threadedly connected to the stem, a driven shaft having a worm thereon, a worm wheel in mesh with said worm and coaxial with the stem, planetary gear means comprising a sun gear on the stem and an intermeshing planetary pinion carried by the worm wheel, said pinion having a stub shaft extending into said worm wheel, and friction brake means carried by the worm wheel and engaged by the stub shaft and resisting the rotation of the planetary pinion, whereby upon rotation of the worm wheel by the worm, said planetary pinion will act to drive the sun gear to rotate the stem and move the pressure disc to effect compression of lubricant within the tubular member between the closed end thereof and said pressure disc to discharge lubricant through said outlet, and whereby said friction brake means will slip and said pinion will track around the sun gear upon the pressure within the tubular member overcoming the force of the friction brake means.

2. A lubricator comprising a tubular lubricant-containing member having a closed end and having at least one outlet adjacent said end, said closed end comprising a closure plate, quick-acting means carried by the tubular member for removably locking said plate in operative position, a threaded stem axially of the tubular member, a pressure disc within the tubular member and threadedly connected to the stem, a driven shaft having a worm thereon, a worm wheel in mesh with said worm and coaxial with the stem, planetary gear means comprising a sun gear on the stem and an intermeshing planetary pinion carried by the worm wheel, said pinion having a stud shaft extending into the worm wheel, and friction brake means carried by the worm wheel and engaged with the stub shaft and resisting the rotation of the planetary pinion, whereby upon rotation of the worm wheel by the worm, said planetary pinion will act to drive the sun gear to rotate the stem and move the pressure disc to effect compression of lubricant within the tubular member between the closed end thereof and said pressure disc to discharge lubricant through said outlet, and whereby said brake means will slip and said pinion will track around the sun gear upon the pressure within the tubular member overcoming the force of the friction brake means.

3. A lubricator comprising a tubular lubricant-containing member having a closed end and having at least one outlet adjacent said end, a threaded stem axially of the tubular member, a pressure disc within the tubular member and threadedly connected to the stem, edge packing on the pressure disc and engaged with the inner wall of the tubular member to hold pressure between said disc and said closed end, a driven shaft having a worm thereon, a worm wheel in mesh with said worm and coaxial with the stem, planetary gear means comprising a sun gear on the stem an intermeshing planetary pinion carried by the worm wheel, said pinion having a stud shaft extending into said worm wheel, and friction brake means carried by the worm wheel and engaged with the stub shaft and resisting the rotation of the planetary pinion, whereby upon rotation of the worm wheel by the worm, said planetary pinion will act to drive the sun gear to rotate the stem and move the pressure disc to effect compression of lubricant within the tubular member between the closed end thereof and said pressure disc to discharge lubricant through said outlet, and whereby said brake means will slip and said pinion will track around the sun gear upon the pressure within the tubular member overcoming the force of the friction brake means.

4. In a lubricator, continuously-driven gearing including a driven gear and a planetary pinion eccentrically carried by the driven gear, a sun gear coaxial with said driven gear and in mesh with the pinion, a threaded stem separably connected to said sun gear, friction brake means connecting the pinion and the driven gear and resisting rotation of the former, a pressure disc threadedly mounted on said stem, and a housing for the stem and disc and having a fixed end opposed to the latter to form a lubricant chamber.

5. A lubricant chamber having outlets, a pressure disc defining one wall of said chamber, a continuously-driven shaft having a worm thereon, a threaded stem for the pressure disc, and means interconnecting the worm and the stem to rotate the latter to move said pressure disc in a direction to force lubricant from said chamber through the outlets thereof, said latter means comprising a worm wheel driven by the worm, a planetary pinion carried by the worm wheel, a sun gear connected to the stem and in mesh with the planetary pinion, and friction brake means connecting the pinion and the worm wheel and resisting rotation of said planetary pinion on its axis, whereby the same drives said sun gear to rotate the stem and move said disc until the friction of the brake means is overcome by the resistance to movement of the disc.

6. In a lubricator, a lubricant chamber having a movable wall and having outlets therein, a continuously-driven shaft, and means for moving said wall to press said lubricant through said outlets and comprising a stem threadedly engaged with said movable wall, a sun gear on said stem, a worm wheel concentric with the sun gear and driven by said driven shaft, a planetary pinion carried by the worm wheel between the periphery and center of the latter and in mesh with the sun gear, and friction means connecting said pinion and worm gear.

7. In a lubricator, a pressure-resisted movable member, a stem threadedly engaged with said member, a driven member, bearing inter-connecting the stem and driven member whereby the former is rotated to effect movement of the pressure-resisted member, said gearing comprising a first gear fixed with said stem, a pinion in mesh with said first gear, and a second gear concentric with the first gear and rotatable by the driven member, and friction brake means connecting said pinion to the second gear whereby said pinion, bodily, is movable with said second gear about the common center of both the first and second gears, said pinion slipping in said brake means and being revoluble on its axis according to the resistance to movement of the pressure-resisted member.

HARRY C. FAIRMAN.

REFERENCES CITED

The following references are of record in the file of this patent:

UNITED STATES PATENTS

| Number | Name | Date |
|---|---|---|
| 1,115,658 | Gazzolo | Nov. 3, 1914 |
| 1,403,018 | Walters | Jan. 10, 1922 |
| 1,707,927 | Searcy | Apr. 2, 1929 |
| 1,732,725 | Kohl | Oct. 22, 1929 |